(12) United States Patent
Ouchi et al.

(10) Patent No.: US 9,864,316 B2
(45) Date of Patent: *Jan. 9, 2018

(54) PAPER CONVEYANCE APPARATUS AND IMAGE FORMING APPARATUS

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventors: Toshiaki Ouchi, Shizuoka (JP); Toshihiro Imai, Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/340,048

(22) Filed: Nov. 1, 2016

(65) Prior Publication Data

US 2017/0090388 A1 Mar. 30, 2017

Related U.S. Application Data

(63) Continuation of application No. 14/867,170, filed on Sep. 28, 2015, now Pat. No. 9,511,972.

(51) Int. Cl.
*B65H 5/00* (2006.01)
*B65H 9/00* (2006.01)
(Continued)

(52) U.S. Cl.
CPC ............ *G03G 15/6529* (2013.01); *B65H 5/06* (2013.01); *B65H 2403/42* (2013.01); *B65H 2801/06* (2013.01)

(58) Field of Classification Search
CPC .......... G03G 15/00; G03G 21/00; B65H 5/00; B65H 5/02; B65H 5/06; B65H 9/00;
(Continued)

(56) References Cited

U.S. PATENT DOCUMENTS 6,128,107 A 10/2000 Kawashima
6,285,852 B1 9/2001 Etoh et al.
(Continued)

FOREIGN PATENT DOCUMENTS

JP 2003-192178 7/2003
JP 2009-274821 11/2009

OTHER PUBLICATIONS

Extended European Search Report for European Patent Application No. 16189526.3 dated Feb. 24, 2017.
(Continued)

*Primary Examiner* — Nguyen Ha
(74) *Attorney, Agent, or Firm* — Amin, Turocy & Watson LLP

(57) ABSTRACT

According to one embodiment, a paper conveyance apparatus includes: a paper feed section on which paper is placed; a first roller configured to be arranged at the upstream side of a reading position where the paper is read to convey the paper at a first speed; a second roller configured to be arranged between the first roller and the paper feed section to convey the paper at a second speed faster than the first speed; a motor; a fourth roller configured to be arranged between the first roller and the reading position and driven by the motor to convey the paper to the reading position at the first speed; and a transmission section configured to always transmit a rotation driving force of the motor to the first roller and the fourth roller.

14 Claims, 5 Drawing Sheets

(51) Int. Cl.
   *G03G 15/00* (2006.01)
   *B65H 5/06* (2006.01)
(58) Field of Classification Search
   CPC ...... B65H 5/062; B65H 29/68; B65H 29/125; B65H 2403/92
   See application file for complete search history.

(56) References Cited

U.S. PATENT DOCUMENTS

| | | |
|---|---|---|
| 9,511,972 B1 * | 12/2016 | Ouchi .................... B65H 29/68 |
| 2002/0098023 A1 | 7/2002 | Mitomi |
| 2005/0012969 A1 | 1/2005 | Matsuyama et al. |
| 2005/0158091 A1 | 7/2005 | Oya et al. |
| 2006/0012104 A1 | 1/2006 | Kim |
| 2007/0086816 A1 | 4/2007 | Iwago et al. |
| 2008/0042339 A1 | 2/2008 | Su et al. |

OTHER PUBLICATIONS

Non-Final Office Action for U.S. Appl. No. 14/867,170 dated Jan. 12, 2016.
Final Office Action for U.S. Appl. No. 14/867,170 dated Apr. 28, 2016.

* cited by examiner

PAPER CONVEYANCE APPARATUS AND IMAGE FORMING APPARATUS

CROSS-REFERENCE TO RELATED APPLICATIONS

This application is a Continuation of application Ser. No. 14/867,170 filed on Sep. 28, 2015, the entire contents of which are incorporated herein by reference.

FIELD

Embodiments described herein relate generally to a paper conveyance apparatus and an image forming apparatus.

BACKGROUND

There is a paper conveyance apparatus which conveys a sheet-like image receiving medium (hereinafter collectively referred to as "paper") to a reading position of a scanner section of an image forming apparatus. The paper conveyance apparatus comprises a register roller aligning the front end of paper and a paper feed roller feeding a paper to the register roller. The paper feed roller abuts the front end of paper against the register roller in the stopped state. The register roller bends the part of paper other than the front end of paper to align the front end of paper. However, in a case in which a plurality of driving sources or electromagnetic clutches for separating the driving of the register roller and the driving of the paper feed roller are arranged, there is a possibility that the apparatus gets large.

DETAILED DESCRIPTION

Figure 1:
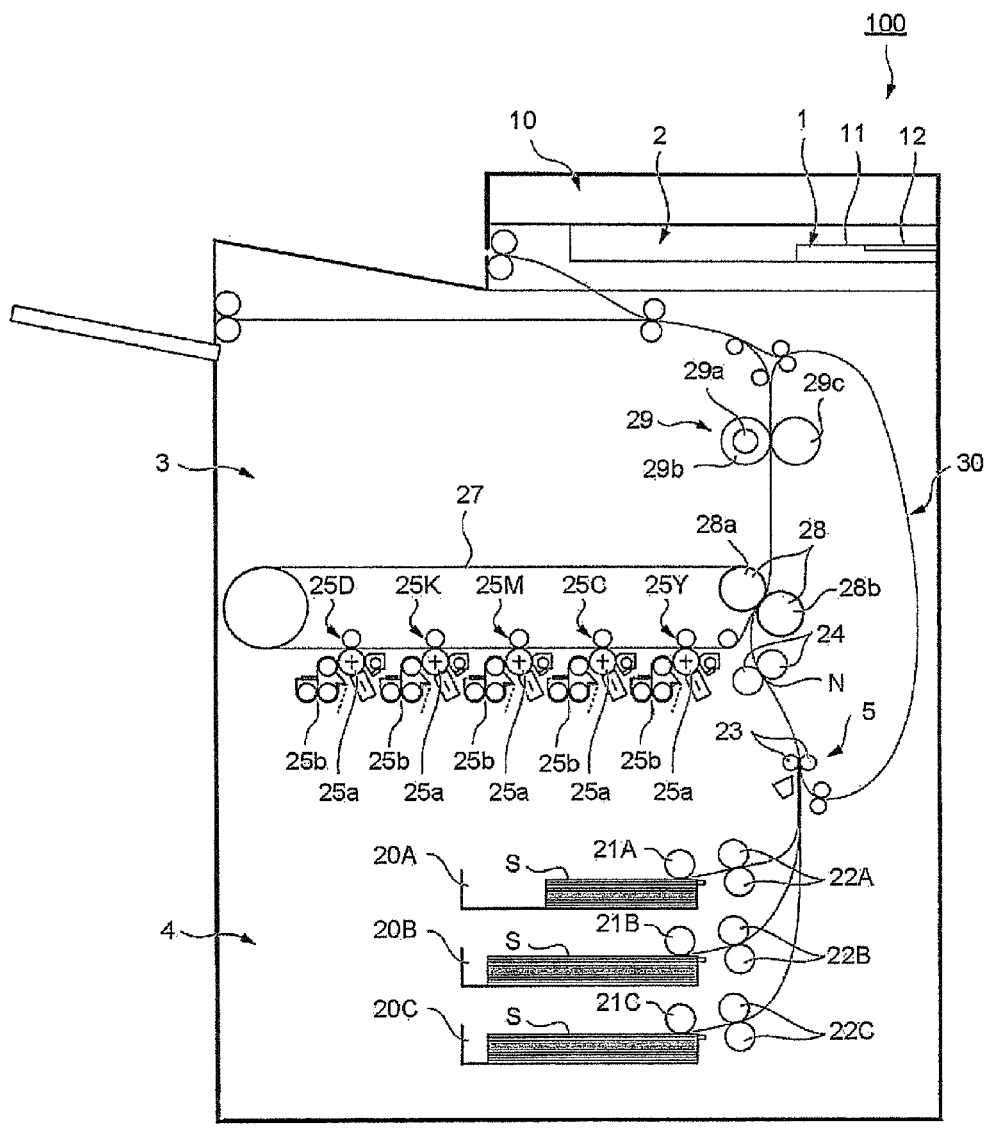
FIG. 1 is a diagram schematically illustrating an example of the whole constitution of an image forming apparatus according to an embodiment.

In accordance with an embodiment, a paper conveyance apparatus comprises a paper feed section, a first roller, a second roller and a motor. Paper is placed in the paper feed section. The first roller is arranged at the upstream side of a reading position where the paper is read. The first roller conveys the paper at a first speed. The second roller is arranged between the first roller and the paper feed section. The second roller conveys the paper at a speed faster than the first speed. The motor drives the first roller and the second roller.

Hereinafter, an image forming apparatus 100 according to an embodiment is described with reference to the accompanying drawings. Further, same components are applied with the same reference numerals in the drawings, and therefore the detailed description is not provided.

FIG. 1 is a diagram schematically illustrating an example of the whole constitution of the image forming apparatus 100 according to the embodiment.

As shown in FIG. 1, the image forming apparatus 100 comprises a control panel 1, a scanner section 2, a printer section 3, a sheet housing section 4 and a conveyance section 5. The image forming apparatus 100 is provided with a paper conveyance apparatus 10 arranged above the scanner section 2.

The image forming apparatus 100 forms an image on the front side of a sheet S with the developing agent such as toner. The sheet S is a sheet-like paper such as a paper or a label paper. As long as the image forming apparatus 100 can form an image on the front side of the sheet S, the form of the sheet S is not limited.

Figure 4:
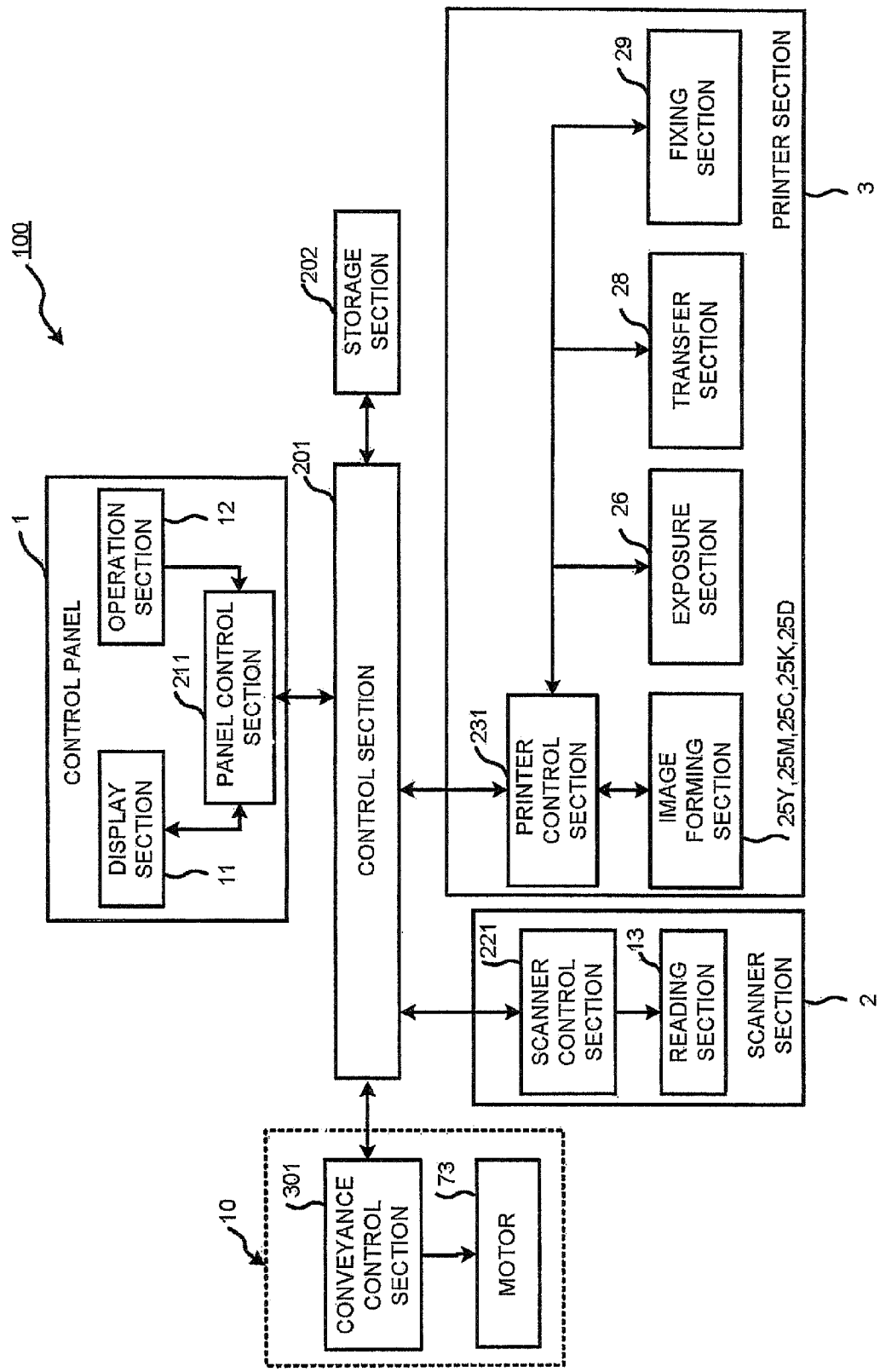
FIG. 4 is a block diagram illustrating an example of the functional components of the image forming apparatus according to the embodiment.

The control panel 1 is provided with a display section 11 and an operation section 12. The display section 11 is a display device such as a liquid crystal display, an organic EL (Electro Luminescence) display and the like. The display section 11 displays various kinds of information relating to the image forming apparatus 100. The operation section 12 has a plurality of buttons and the like. The operation section 12 receives operations of a user on the plurality of buttons. The control panel 1 outputs a signal according to the operation of the user on the operation section 12 to a later-described control section 201 as shown in FIG. 4. Further, the display section 11 and the operation section 12 may be a touch panel that is formed integrally.

The scanner section 2 reads image information of reading object as the brightness and darkness of light. The scanner section 2 generates image data based on the read image information, and stores the image data in a later-described storage section 202 shown in FIG. 4. The image data generated by the scanner section 2 may be, for example, sent to other information processing device through the network. The image data generated by the scanner section 2 may be, for example, output to the printer section 3.

The printer section 3 forms an image on the front side of the sheet S based on the image data generated by the scanner section 2 or the image data received from other information processing device via the network. For example, the printer section 3 forms an image with toner (hereinafter referred to as a toner image). The printer section 3 transfers the toner image to the front side of the sheet S. The printer section 3 applies heat and pressure to the toner image on the front side of the sheet S to fix the toner image on the sheet S.

The sheet housing section 4 supplies the sheet S one by one to the printer section 3 at timings when the printer section 3 forms the toner image. The sheet housing section comprises a plurality of paper feed cassettes 20A, 20B and 20C. The paper feed cassettes 20A, 20B and 20C respectively store the sheet S of a preset size and category. The paper feed cassettes 20A, 20B and 20C are provided with pickup rollers 21A, 21B and 21C respectively. Each of the pickup rollers 21A, 21B and 21C picks up the sheet S one by one from the paper feed cassettes 20A, 20B and 20C, respectively. The pickup rollers 21A, 21B and 21C supply the picked up sheet S to the conveyance section 5.

The conveyance section 5 conveys the sheet S in the printer section 3 and the sheet housing section 4. The conveyance section 5 is provided with a conveyance roller and a register roller 24. The conveyance section 5 conveys the sheet S supplied from the pickup rollers 21A, 21B and 21C to the register roller 24. The register roller 24 conveys the sheet S in response to timings when a later-described transfer section 28 of the printer section 3 transfers the toner image to the front side of the sheet S. The conveyance roller 23 abuts the front end in the conveyance direction of the sheet S against a nip N of the register roller 24. The conveyance roller 23 bends the sheet S to align the position of the front end of the sheet S in the conveyance direction. The register roller 24 conveys the sheet S to the transfer section 28 after the front end of the sheet S sent from the conveyance roller 23 is aligned in the nip N.

Hereinafter, the detailed description of the scanner section 2 is described with reference to FIG. 2. Hereinafter, in order to distinguish a sheet Q serving as a reading object from the sheet S on which image data is printed, the sheet Q serving as a reading object is referred to as an original Q. The original Q is a sheet-like paper.

The scanner section 2 comprises a reading section 13 which reads the original Q conveyed by the paper conveyance apparatus 10 through a scanning optical system. The reading section 13 comprises an original table 14, a first carriage 15, a second carriage 16 and an image capturing section 17. A direction in which the first carriage 15 moves is a vertical scanning direction y. In the original table 14, a direction orthogonal to the vertical scanning direction y is a horizontal scanning direction x. A direction which is orthogonal to both the horizontal direction x and the vertical scanning direction y is a height direction z.

The original table 14 is provided with a through-read glass 14a and an original table glass 14b. The light irradiated to the original Q conveyed by the paper conveyance apparatus 10 and the reflected light from the original Q can pass through the through-read glass 14a. The light irradiated to the original Q placed on the surface of the original table glass 14b and the reflected light from the original Q can pass through original table glass 14b.

The first carriage 15 is provided with a light source 15a and a first mirror 15b. The first carriage 15 doesn't move at the time of reading the image information from the original Q conveyed by the paper conveyance apparatus 10. The first carriage 15 moves in the vertical scanning direction y at the time of reading the image information from the original Q on the original table glass 14b. The light source 15a emits light. The light emitted from the light source 15a transmits the through-read glass 14a or the original table glass 14b to be irradiated to the original Q. The reflected light (which is reflected by the original Q) of the light irradiated to the original Q transmits the through-read glass 14a or the original table glass 14b to enter the first mirror 15b. The first mirror 15b reflects the reflected light from the original Q to the second mirror 16a of the second carriage 16.

The second carriage 16 is provided with a second mirror 16a and a third mirror 16b. The second carriage 16 moves in a same direction as the first carriage 15 along with the movement of the first carriage 15. The second mirror 16a reflects the light from the first mirror 15b to the third mirror 16b. The third mirror 16b reflects the light from the second mirror 16a to a condensing lens 17a of the image capturing section 17.

The image capturing section 17 comprises the condensing lens 17a and a CCD sensor 17b. The condensing lens 17a converge the light from the third mirror 16b. The condensing lens 17a images the converged light on an imaging surface (reading surface) of the CCD sensor 17b. The CCD sensor 17b converts the light imaged by the condensing lens 17a into charge. The CCD sensor 17b converts the image imaged by the condensing lens 17a into an electric signal. The CCD sensor 17b generates image data based on the electric signal generated through the photoelectric conversion. The CCD sensor 17b outputs the generated image data to a later-described scanner section 221 shown in FIG. 4.

A reading position T where the image information of the original Q conveyed by the paper conveyance apparatus 10 is read is a fixed position on the through-read glass 14a. The reading position T is a position of one line extending in the horizontal scanning direction x. When the original Q is conveyed to the reading position T by the paper conveyance apparatus 10, the images at the reading position T of the original Q are sequentially imaged on the imaged surface of the CCD sensor 17b. The CCD sensor 17b stores a signal corresponding to an imaged image at the reading position T as a signal of one line in the horizontal scanning direction x. The CCD sensor 17b generates an entire image data of the original Q based on signals of a plurality of lines.

The reading position when the image information of the original Q on the original table glass 14b moves in the vertical scanning direction y along with the movement of the first carriage 15. As a result, the images at the reading position of the original Q are sequentially imaged on the imaged surface of the CCD sensor 17b. The CCD sensor 17b stores a signal corresponding to an imaged image at the reading position as a signal of one line in the horizontal scanning direction x. The CCD sensor 17b generates an entire image data of the original Q based on signals of a plurality of lines.

Hereinafter, the detailed description of the printer section 3 is described with reference to FIG. 1.

The printer section 3 comprises a plurality of image forming sections 25Y, 25M, 25C, 25K and 25D, an exposure section 26, an intermediate transfer belt 27, the transfer section 28 and a fixing section 29.

Each of the plurality of image forming sections 25Y, 25M, 25C, 25K and 25D forms a toner image to be transferred to the sheet S. Each of the plurality of image forming sections 25Y, 25M, 25C, 25K and 25D includes a photoconductive drum (image carrier) 25a. Each of the plurality of image forming sections 25Y, 25M, 25C, 25K and 25D is provided with a developing device 25b which supplies toner selectively on the surface of each photoconductive drum 25a. The developing device 25b houses non-decolorable yellow, magenta, cyan and black toner and decolorable toner. The decolorable toner is decolored at a temperature higher than a given decoloring temperature.

The exposure section 26 is arranged opposite to the photoconductive drum 25a of each of the image forming sections 25Y, 25M, 25C, 25K and 25D. The exposure section 26 irradiates the surface of the photoconductive drum 25a of each of the image forming sections 25Y, 25M, 25C, 25K and 25D with laser light based on the image data. In this way, the exposure section 26 forms an electrostatic latent image on the surface of the photoconductive drum 25a of each of the image forming sections 25Y, 25M, 25C, 25K and 25D. Each developing device 25b develops the electrostatic latent image by supplying toner to the electrostatic latent image on the surface of each photoconductive drum 25a. Each developing device 25b enables the charged toner to adhere to the electrostatic latent image on the surface of each photoconductive drum 25a to form a toner image. The developing device 25b of the image forming section 25Y develops the electrostatic latent image on the surface of the photoconductive drum 25a with yellow toner. The developing device 25b of the image forming section 25M develops the electrostatic latent image on the surface of the photoconductive drum 25a with magenta toner. The developing device 25b of the image forming section 25C develops the electrostatic latent image on the surface of the photoconductive drum 25a with cyan toner. The developing device 25b of the image forming section 25K develops the electrostatic latent image on the surface of the photoconductive drum 25a with black toner. The developing device 25b of the image forming section 25D develops the electrostatic latent image on the surface of the photoconductive drum 25a with the decolorable toner.

Each of the image forming sections 25Y, 25M, 25C, 25K and 25D transfers (primarily transfer) the charged toner image on the surface of each photoconductive drum 25a to the surface of the intermediate transfer belt 27. Each of the image forming sections 25Y, 25M, 25C, 25K and 25D applies a transfer bias voltage to the toner image on each photoconductive drum 25a at each primary transfer position. Each of the image forming sections 25Y, 25M, 25C and 25K overlaps the toner image of each color on the surface of each photoconductive drum 25a to transfer the overlapped toner image to the surface of the intermediate transfer belt 27. In this way, a color toner image is formed. The image forming section 25D transfers the decolorable toner image to the intermediate transfer belt 27.

The transfer section 28 is provided with a supporting roller 28a and a secondary transfer roller 28b which nip the intermediate transfer belt 27 and the sheet S from two sides in the thickness direction. A position where the supporting roller 28a faces the secondary transfer roller 28b is a secondary transfer position. The transfer section applies a transfer bias voltage corresponding to the transfer current at the secondary transfer position to transfer the charged toner image on the surface of the intermediate transfer belt 27 to the surface of the sheet S.

The fixing section 29 is provided with a pressure roller 29c and a heat roller 29b in which a heating section 29a is arranged. The pressure roller 29c is contacted with the heat roller 29b that is heated by the heating section 29a in a pressed state. The pressure roller 29c and the heat roller 29b convey the sheet S in a state of nipping the sheet S from the two sides in the thickness direction of the sheet S. The pressure roller 29c and the heat roller 29b fix the toner image on the surface of the sheet S on the sheet S through the heat and pressure applied to the sheet S.

The printer section 3 comprises a reversal unit 30. The reversal unit 30 reverses the sheet S discharged from the fixing section 29 through switchback. The reversal unit 30 conveys the reversed sheet S to the register roller 24 again. The reversal unit 30 reverses the sheet S to form an image on the back side of the sheet S subjected to the fixing processing.

The paper conveyance apparatus 10 is carried at the upper portion of the image forming apparatus 100. The paper conveyance apparatus 10 is arranged above the scanner section 2. The paper conveyance apparatus 10 supplies the original Q to the scanner section 2.

Hereinafter, the constitution of the paper conveyance apparatus 10 is described.

Figure 2:
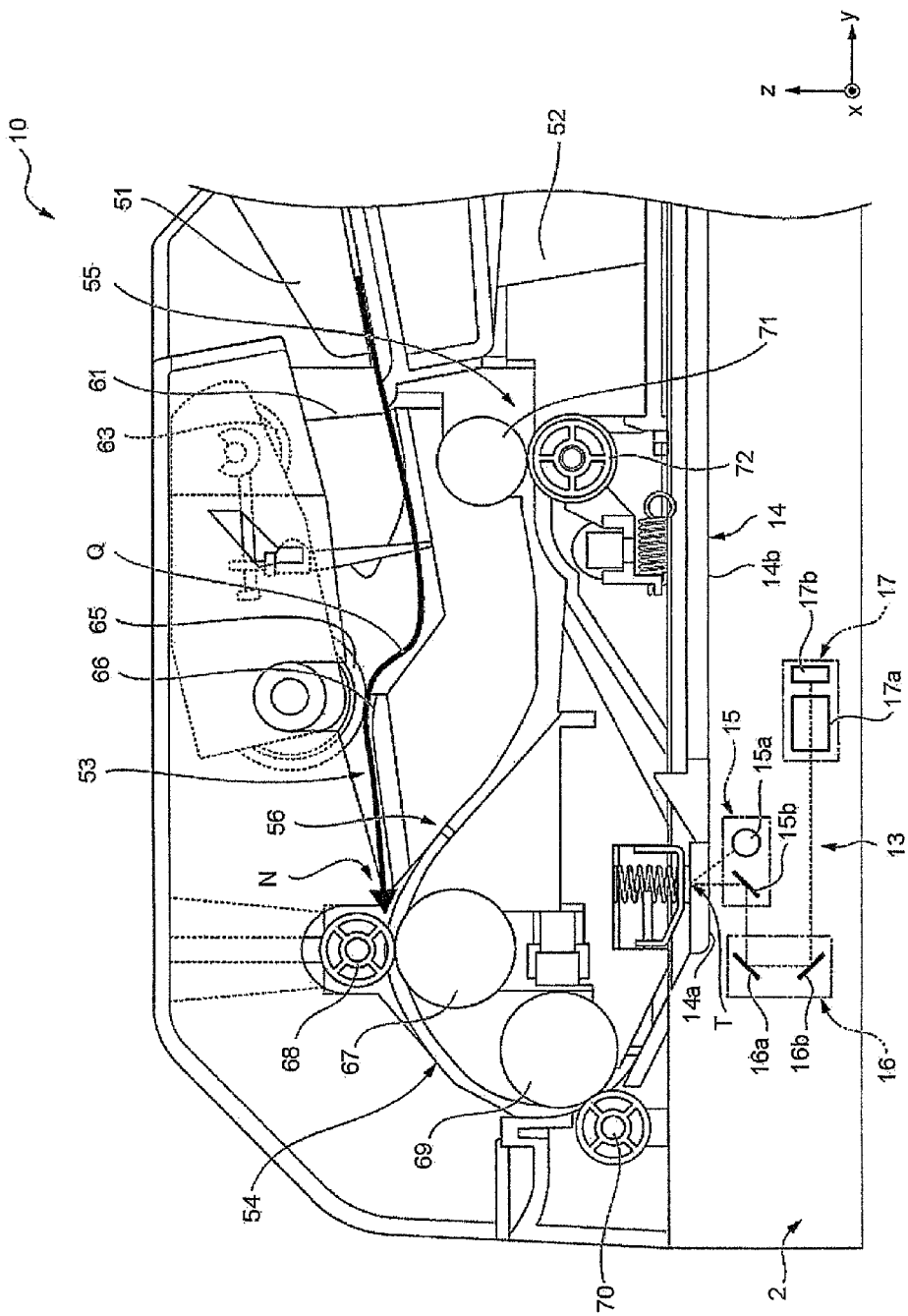
FIG. 2 is a cross-sectional view schematically illustrating an example of the constitution of a paper conveyance apparatus according to the embodiment.
Figure 3:
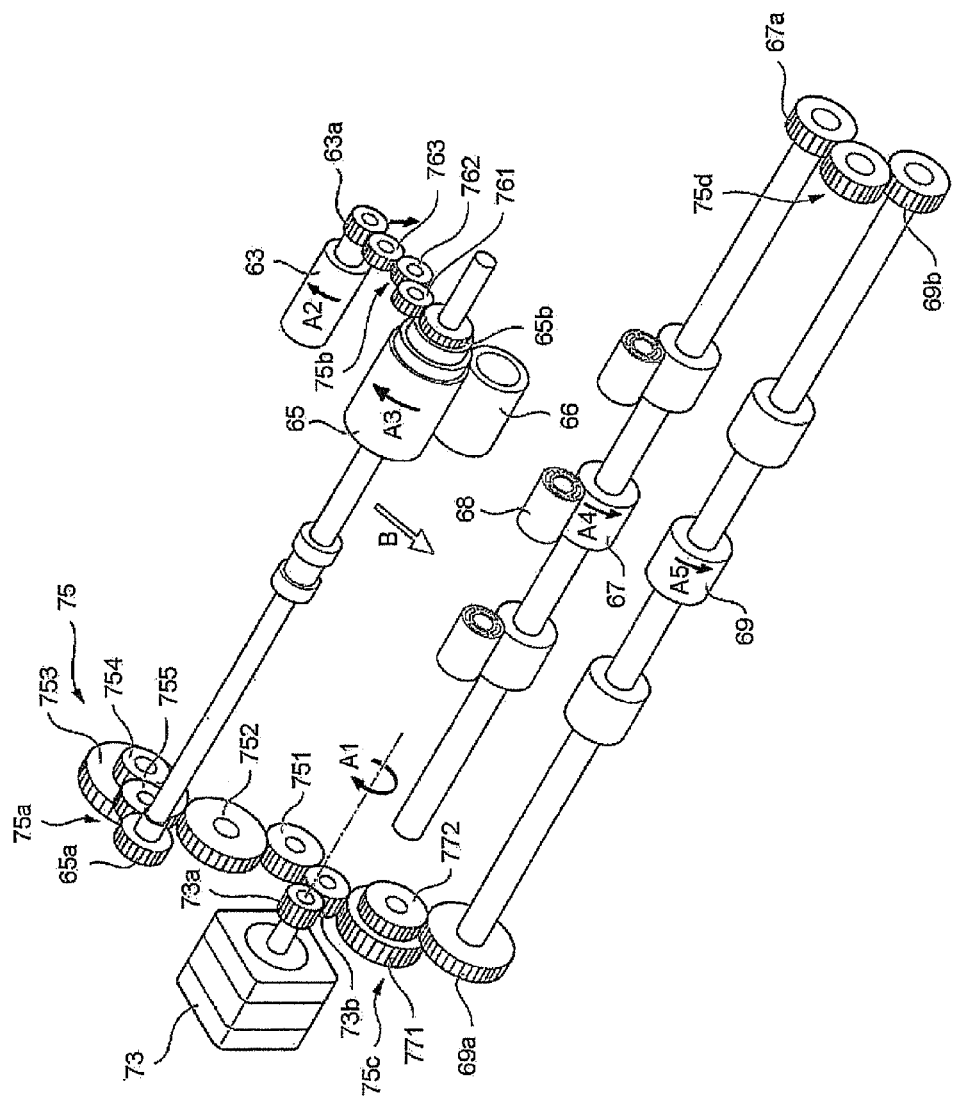
FIG. 3 is a perspective view schematically illustrating an example of the constitutions of a paper feed roller, a first conveyance roller, a second conveyance roller and a motor of the paper conveyance apparatus according to the embodiment.

FIG. 2 is a cross-sectional view schematically illustrating an example of the constitution of the paper conveyance apparatus 10 according to the embodiment. FIG. 3 is a perspective view schematically illustrating an example of the constitutions of a paper feed roller 65, a first conveyance roller 67, a second conveyance roller 69 and a motor 73 of the paper conveyance apparatus 10 according to the embodiment.

As shown in FIG. 2, the paper conveyance apparatus 10 comprises a paper feed tray 51, a paper discharge tray 52, a paper feed path 53, a conveyance path 54, a paper discharge path 55 and a reversal path 56. The paper feed tray 51 is a paper feed section on which the original Q is placed. The paper feed path 53 is connected with the paper feed tray 51 and the reversal path 56. The paper feed path 53 guides the original Q from the paper feed tray 51 to the conveyance path 54. The conveyance path 54 is connected with the paper discharge path 55 and the reversal path 56 through the reading position T of the original Q. The conveyance path 54 guides the original Q from the paper feed path 53 to the reading position T. The conveyance path guides the original Q passing through the reading position T to the paper discharge path 55 and the reversal path 56. The paper discharge path 55 is connected with the paper discharge tray 52. The paper discharge path 55 guides the original Q from the conveyance path 54 to the paper discharge tray 52. The reversal path 56 is connected with a downstream end in the paper feed direction of the paper feed path 53. The reversal path 56 turns the original Q from the conveyance path 54 upside down to guide the original Q to the downstream end in the paper feed direction of the paper feed path 53.

The paper conveyance apparatus 10 comprises a paper sensor 61, a pickup roller 63, the paper feed roller 65, the first conveyance roller 67, the second conveyance roller 69 and a paper discharge roller 71. As shown in FIG. 3, the paper conveyance apparatus 10 comprises the motor 73 and a transmission section 75. The first conveyance roller 67 is a first roller which is arranged at the upstream side of the reading position T to convey an original at a first speed. The paper feed roller 65 is a second roller which is arranged between the first roller and the paper feed section to convey the original at a speed faster than the first speed.

The paper sensor 61 detects whether or not there is an original Q which is stacked in the paper feed tray 51.

The pickup roller 63 is connected with the motor 73 through the transmission section 75. The pickup roller 63 is driven to rotate through a rotation driving force of the motor 73 transmitted by the transmission section 75. The pickup roller 63 is moved up and down to switch the contact or non-contact with the original Q in the paper feed tray 51. The pickup roller 63 rotates in a state of being contacted with the original Q in the paper feed tray 51 to pick up the original Q in the paper feed tray 51 to the paper feed path 53. The pickup roller 63 contacts with a first side of the original Q. The first side of the original Q is one side on which the image information is read by the scanner section 2.

The paper feed roller 65 is arranged on the paper feed path 53. The paper feed roller 65 is connected with the motor 73 through the transmission section 75. A paper feed driven roller 66 is pressed against the peripheral surface of the paper feed roller 65. The paper feed roller 65 is driven to rotate through a rotation driving force of the motor 73 transmitted by the transmission section 75. The paper feed driven roller 66 is rotation-driven through the rotation driving force transmitted from the peripheral surface of the paper feed roller 65. The paper feed roller 65 and the paper feed driven roller 66 feed the original Q from the pickup roller 63 to the conveyance path 54 in a state of nipping the original Q from the two sides in the thickness direction. The paper feed roller 65 contacts with the first side of the original Q. The first side of the original Q is one side on which the image information is read by the scanner section 2.

The first conveyance roller 67 is arranged at the upstream side of the conveyance path 54. For example, the diameter of the first conveyance roller 67 is formed to be smaller than the diameter of the paper feed roller 65. The first conveyance roller 67 is connected with the motor 73 through the transmission section 75. A first driven roller is pressed against the peripheral surface of the first conveyance roller 67. The first conveyance roller 67 is driven to rotate through a rotation driving force of the motor 73 transmitted by the transmission section 75. The first driven roller 68 is rotation-driven through the rotation driving force transmitted from the peripheral surface of the first conveyance roller 67. The first conveyance roller 67 and the first driven roller 68 convey the original Q from the paper feed path 53 to the conveyance path 54 in a state of nipping the original Q from the two sides in the thickness direction. The first conveyance roller 67 contacts with a second side of the original Q from the paper feed path 53. The second side of the original Q is the back side of the first side on which the image information is read by the scanner section 2.

The second conveyance roller 69 is a fourth roller that is arranged between the first conveyance roller 67 and the reading position T. The second conveyance roller 69 is arranged at the downstream side of the first conveyance roller 67 on the conveyance path 54. For example, the diameter of the second conveyance roller 69 is formed to be the same as that of the first conveyance roller 67. The second conveyance roller 69 is connected with the motor 73 through the transmission section 75. A second driven roller 70 is pressed against the peripheral surface of the second conveyance roller 69. The second conveyance roller 69 is driven to rotate through a rotation driving force of the motor 73 transmitted by the transmission section 75. The second driven roller 70 is rotation-driven through the rotation driving force transmitted from the peripheral surface of the second conveyance roller 69. The second conveyance roller 69 and the second driven roller 70 convey the original Q from the first conveyance roller 67 to the reading position T in a state of nipping the original Q from the two sides in the thickness direction. The second conveyance roller 69 contacts with the second side of the original Q from the paper feed path 53. The second side of the original Q is the back side of the first side on which the image information is read by the scanner section 2.

The paper discharge roller 71 is a third roller that is arranged at the downstream side of the reading position T. The paper discharge roller 71 is arranged at the upstream side of the paper discharge path 55. For example, the diameter of the paper discharge roller 71 is formed to be smaller than the diameter of the paper feed roller 65. For example, the diameter of the paper discharge roller 71 is formed to be smaller than the diameter of the first conveyance roller 67. The paper discharge roller 71 is connected with the motor 73 through the transmission section 75. A paper discharge driven roller 72 is pressed against the peripheral surface of the paper discharge roller 71. The paper discharge roller 71 is driven to rotate through a rotation driving force of the motor 73 transmitted by the transmission section 75. The paper discharge driven roller 72 is rotation-driven through the rotation driving force transmitted from the peripheral surface of the paper discharge roller 71. The paper discharge roller 71 and the paper discharge driven roller 72 convey the original Q from the conveyance path 54 to the paper discharge tray 52 in a state of nipping the original Q from the two sides in the thickness direction.

The motor 73 is connected with the pickup roller 63, the paper feed roller 65, the first conveyance roller 67, the second conveyance roller 69 and the paper discharge roller 71 through the transmission section 75.

The transmission section 75 transmits the rotation driving force of the motor 73 to each of the pickup roller 63, the paper feed roller 65, the first conveyance roller 67, the second conveyance roller 69 and the paper discharge roller 71.

The transmission section 75 is provided with a first transmission section 75a which connects a rotation axis of the motor 73 with a rotation axis of the paper feed roller 65. The first transmission section 75a is provided with five gears between a gear 73b meshing with a gear 73a fixed to a rotation axis of the motor 73 and a gear 65a at a first end of a rotation axis of the paper feed roller 65. The five gears are a gear 751, a gear 752, a gear 753, a gear 754 and a gear 755. The gear 751 is meshed with the gear 73b. The gear 73b meshing with the gear 73a fixed to the rotation axis of the motor 73 rotates in an opposite direction to the rotation direction of the gear 73a of the motor 73. The gear 751 rotates in a same direction as the rotation direction of the gear 73a of the motor 73. The gear 751 is meshed with the gear 752. The gear 752 rotates in an opposite direction to the rotation direction of the gear 751. The gear 752 is meshed with the gear 753. The gear 753 rotates in an opposite direction to the rotation direction of the gear 752. The gear 753 is coaxially and integrally connected with the gear 754. The gear 754 rotates in a same direction as the rotation direction of the gear 753. The gear 754 is meshed with the gear 755. The gear 755 rotates in an opposite direction to the rotation direction of the gear 754. The gear 755 is meshed with the gear 65a fixed at the first end of the rotation axis of the paper feed roller 65. The gear 65a rotates in an opposite direction to the rotation direction of the gear 755. The rotation driving force of the motor 73 is transmitted to the rotation axis of the paper feed roller 65 through the gears 73a, 73b, 751, 752, 753, 754, 755 and 65a which are meshed with each other sequentially.

The first transmission section 75a makes the rotation direction of the gear 65a around the rotation axis of the paper feed roller 65 same as the rotation direction of the gear 73a around the rotation axis of the motor 73. If the gear 73a of the motor 73 rotates in a clockwise direction indicated by an arrow A1 shown in FIG. 3, the first transmission section 75a enables the gear 65a of the paper feed roller 65 to rotate in a same arrow direction A3 as the direction of the first transmission section 75a. A transmission ratio K1 of the first transmission section 75a from the gear 73a of the motor 73 to the rotation axis of the paper feed roller 65 is a unique value for the number of teeth of each gear of the first transmission section 75a.

The transmission section 75 is provided with a second transmission section 75b which connects a rotation axis of the paper feed roller 65 with a rotation axis of the pickup roller 63. The second transmission section 75b is provided with three gears between a gear 65b at a second end of the rotation axis of the paper feed roller 65 and a gear 63a of the rotation axis of the pickup roller 63. The three gears are a gear 761, a gear 762, and a gear 763. The gear 761 is meshed with the gear 65b fixed at the second end of the rotation axis of the paper feed roller 65. The gear 65b fixed to the rotation axis of the paper feed roller 65 together with the gear 65a rotates in a same direction as the rotation direction of the gear 73a of the motor 73. The gear 761 rotates in an opposite direction to the rotation direction of the gear 73a of the motor 73. The gear 761 is meshed with the gear 762. The gear 762 rotates in an opposite direction to the rotation direction of the gear 761. The gear 762 is meshed with the gear 763. The gear 763 is meshed with the gear 63a fixed to the rotation axis of the pickup roller 63. The gear 63a rotates in an opposite direction to the rotation direction of the gear 763. First, the rotation driving force of the motor 73 is transmitted to the rotation axis of the paper feed roller 65 through the first transmission section 75a. Next, the rotation driving force of the motor 73 is transmitted to the rotation axis of the pickup roller 63 through the gears 65b, 761, 762, 763 and 63a which are meshed with each other sequentially.

The second transmission section 75b makes the rotation direction of the gear 65b around the rotation axis of the paper feed roller 65 same as the rotation direction of the gear 63a around the rotation axis of the pickup roller 63. The first transmission section 75a and the second transmission section 75b make the rotation direction of the gear 73a of the motor 73 same as the rotation direction of the gear 63a of the pickup roller 63. If the gear 73a of the motor 73 rotates in a clockwise direction indicated by the arrow A1 shown in FIG. 3, the gear 63a of the pickup roller 63 rotates in a same indirection indicated by an arrow A2 as the arrow A1 direction.

The paper feed roller 65 and the pickup roller 63 contact with the first side of the original Q. The second transmission section 75b enables the rotation direction of each of the paper feed roller 65 and the pickup roller 63 to be the same direction. Between the gear 65b of the paper feed roller 65 and the gear 63a of the pickup roller 63 in the second transmission section 75b, the total number (three) of the gears which are meshed with each other sequentially is an odd number.

The transmission section 75 is provided with a third transmission section 75c which connects the rotation axis of the motor 73 with the rotation axis of the second conveyance section 69. The third transmission section 75c is provided with two gears between the gear 73b meshing with the gear 73a fixed to the rotation axis of the motor 73 and a gear 69a at the first end of the rotation axis of the second conveyance roller 69. The two gears are a gear 771 and a gear 772. The gear 771 is meshed with the gear 73b. The gear 73b meshing with the gear 73a fixed to the rotation axis of the motor 73 rotates in an opposite direction to the rotation direction of the gear 73a of the motor 73. The gear 771 rotates in a same direction as the rotation direction of the gear 73a of the motor 73. The gear 772 is coaxially and integrally connected with the gear 771. The gear 772 rotates in a same direction as the rotation direction of the gear 771. The gear 772 is meshed with the gear 69a fixed at the first end of the rotation axis of the second conveyance roller 69. The gear 69a rotates in an opposite direction to the rotation direction of the gear 772. The rotation driving force of the motor 73 is transmitted to the rotation axis of the second conveyance roller 69 through the gears 73a, 73b, 771, 772 and 69a which are meshed with each other sequentially.

The third transmission section 75c makes the rotation direction of the gear 69a around the rotation axis of the second conveyance roller 69 opposite to the rotation direction of the gear 73a around the rotation axis of the motor 73. If the gear 73a of the motor 73 rotates in a clockwise direction indicated by an arrow A1 shown in FIG. 3, the third transmission section 75c enables the gear 69a of the second, conveyance roller 69 to rotate in an anticlockwise direction indicated by an arrow A5.

The paper feed roller 65 contacts with the first side of the original Q, and the second conveyance roller 69 contacts with the second side of the original Q. The first transmission section 75a and the third transmission section 75c enable the rotation direction of each of the paper feed roller 65 and the second conveyance roller 69 to be an opposite direction to each other. Whether the total number of the gears that are meshed with each other sequentially in the first transmission section 75a and the third transmission section 75c is an even number or an odd number is different. Since the gear 753 and the gear 754 are integrally connected with each other in the first transmission section 75a, they function as one gear with respect to the gear 752 and the gear 755 which are before and after them. The total number (five) of the gears that are meshed with each other sequentially to switch the rotation direction between the gear 73a of the motor 73 and the gear 65a of the paper feed roller 65 in the first transmission section 75a is an odd number. Since the gear 771 and the gear 772 are integrally connected with each other in the third transmission section 75c, they function as one gear with respect to the gear 73b and the gear 69a which are before and after them. The total number (two) of the gears that are meshed with each other sequentially to switch the rotation direction between the gear 73a of the motor 73 and the gear 69a of the second conveyance roller 69 in the third transmission section 75c is an even number.

A transmission ratio K2 of the third transmission section 75c from the gear 73a of the motor 73 to the rotation axis of the second conveyance roller 69 is a unique value for the number of teeth of each gear of the third transmission section 75c. The transmission ratio K2 of the third transmission section 75c is higher than the transmission ratio K1 of the first transmission section 75a. The teeth of each gear of the first transmission section 75a and the teeth of each gear of the third transmission section 75c are formed in such a manner that the transmission ratio K2 is higher than the transmission ratio K1. The rotation number of the paper feed roller 65 is greater than the rotation number of the second conveyance roller 69 corresponding to the transmission ratio K1 of the first transmission section 75a and the transmission ratio K2 of the third transmission section 75c. As the diameter of the second conveyance roller 69 is smaller than that of the paper feed roller 65, the conveyance speed of the second conveyance roller 69 with respect to the original Q is relatively slower than the conveyance speed of the paper feed roller 65.

The transmission section 75 is provided with a fourth transmission section 75d which connects the rotation axis of the second conveyance roller 69 with a rotation axis of the first conveyance roller 67. The fourth transmission section 75d is provided with one gear meshing with a gear 69b fixed at the second end of the rotation axis of the second conveyance roller 69 and a gear 67a fixed to the rotation axis of the first conveyance roller 67. The gear 69b fixed to the rotation axis of the second conveyance roller 69 together with the gear 69a rotates in an opposite direction to the rotation direction of the gear 73a of the motor 73. The gear of the fourth transmission section 75d rotates in a same direction as the rotation direction of the gear 73a of the motor 73. The gear 67a fixed to the rotation axis of the first conveyance roller 67 rotates in an opposite direction to the gear of the fourth transmission section 75d. First, the rotation driving force of the motor 73 is transmitted to the rotation axis of the second conveyance roller 69 through the third transmission section 75c. Next, the rotation driving force of the motor is transmitted to the rotation axis of the first conveyance roller 67 through the gears 69b, the gear of the fourth transmission section 75d and the gear 67a which are meshed with each other sequentially.

The fourth transmission section 75d makes the rotation direction of the gear 69b around the rotation axis of the second conveyance roller 69 same as the rotation direction of the gear 67a around the rotation axis of the first conveyance roller 67a. The third transmission section 75c and the fourth transmission section 75d enables the rotation direction of the gear 73a of the motor 73 and the rotation direction of the gear 67a of the first conveyance roller 67 to be an opposite direction to each other. If the gear 73a of the motor 73 rotates in a clockwise direction indicated by the arrow A1 shown in FIG. 3, the gear 67a of the first conveyance roller 67 rotates in an anticlockwise direction indicated by an arrow A4.

The first conveyance roller 67 and the second conveyance roller 69 contact with the second side of the original Q. The fourth transmission section 75d enables the rotation direction of each of the first conveyance roller and the second conveyance roller 69 to be the same direction. The total number (one) of the gear which is meshed with the gear 69a of the second conveyance roller 69 and the gear 67a of the first conveyance roller 67 in the fourth transmission section 75d is an odd number.

The shape of each of the gear 69b of the rotation axis of the second conveyance roller 69 and the gear 67a of the rotation axis of the first conveyance roller 67 which are meshed with the gear of the fourth transmission section 75d is formed to be a same shape. Since the teeth of each of the gear 69b and the gear 67a are the same, the gear of the fourth transmission section 75d enables the rotation axis of the second conveyance roller 69 and the rotation axis of the first conveyance roller 67 to rotate at a same rotation number. Because the diameter of the first conveyance roller 67 and the diameter of the second conveyance roller 69 are equal to each other, the conveyance speed of the first conveyance roller 67 with respect to the original Q is the same as the conveyance speed of the second conveyance roller 69. The conveyance speed of the first conveyance roller 67 with respect to the original Q is relatively slower than the conveyance speed of the paper feed roller 65.

The transmission section 75 is provided with a fifth transmission section (not shown) which transmits the rotation driving force of the motor 73 to the paper discharge roller 71. A transmission ratio of the fifth transmission section makes the conveyance speed of the paper discharge roller 71 with respect to the original Q same as the conveyance speed of the second conveyance roller 69 having a diameter larger than that of the paper discharge roller 71. The speed (reading speed) of the original Q passing through the reading position T is the same as the conveyance speed of each of the first conveyance roller 67, the second conveyance roller 69, and the paper discharge roller 71.

Hereinafter, the functional components of the image forming apparatus 100 are described with reference to FIG. 4. FIG. 4 is a block diagram illustrating an example of the functional components of the image forming apparatus 100.

The control panel 1, the scanner section 2 and the printer section 3 are connected with the control section 201. The control section 201 collectively controls the whole operations of the image forming apparatus 100. The control section 201 controls the CPU of each of the control panel 1, the scanner section 2, the printer section 3 and the paper conveyance apparatus 10. The control section 201 comprises a CPU, an ROM and an RAM. The ROM stores a control program controlling the whole operations of the image forming apparatus 100. The RAM temporarily stores various kinds of data used in the processing by the CPU. The control section 201 is connected with the storage section 202 and a conveyance control section 301 of the paper conveyance apparatus 10.

The storage section 202 stores the image data generated by the scanner section 2 or the image data received from other information processing devices through a network. For example, the storage section 202 is a hard disk device or a semiconductor memory.

The control panel 1 comprises a display section 11, an operation section 12 and a panel control section 211. The panel control section 211 controls operations of each of the display section 11 and the operation section 12. The panel control section 211 comprises a CPU, an ROM and an RAM. The ROM stores a control program for controlling the operations of each of the display section 11 and the operation section 12. The RAM temporarily stores various kinds of data used in the processing by the CPU.

The display section 11 displays various kinds of information relating to the operations of the image forming apparatus 100 designated by the user. The display section displays the information input by operating the operation section 12 by the user. For example, the operation section 12 receives the operations of the user for inputting information relating to the processing executed by each of the scanner section 2 and the printer section 3. The information relating to the processing executed by the scanner section 2 is, for example, information of reading resolution, compressibility, color information and the like. The information relating to the processing executed by the printer section 3 is, for example, information of the number of printings of the sheet S, the printing condition, the size of the sheet S, the category of the sheet S and the like. The printing condition is, for example, a designation on a monochrome printing or a color printing, a designation on a simplex printing or a duplex printing, an orientation of the sheet S with respect to the conveyance direction, and the like. The operation section 12 outputs various kinds of information designated by the user to the panel control section 211. The panel control section 211 outputs the information from the operation section 12 to the control section 201. The control section 201 outputs the information from the panel control section 211 to the scanner section 2 or the printer section 3.

The operation section 12 receives, for example, a reading instruction of the image information to the scanner section 2 and an instruction of paper feed execution to the paper conveyance apparatus 10. The display section 11 displays the instruction information input by operating the operation section 12 by the user. The operation section 12 outputs the instruction information input by the user to the panel control section 211. The panel control section 211 outputs the instruction information from the operation section 12 to the control section 201. The control section 201 outputs the instruction information from the panel control section 211 to the scanner section 2 or the paper conveyance apparatus 10.

The scanner section 2 comprises a scanner control section 221. The scanner control section 221 controls the reading section 13 to read the image information. The scanner control section 221 comprises a CPU, an ROM and an RAM. The ROM stores a control program for controlling operations of the reading section 13. The RAM temporarily stores various kinds of data used in the processing by the CPU. The reading section 13 reads the image information of a reading object as the brightness and darkness of light, and generates image data based on the image information.

The printer section 3 comprises a printer control section 231. The printer control section 231 controls the printer section 3 to print an image on the sheet S. The printer control section 231 comprises a CPU, an ROM and an RAM. The ROM stores a control program for controlling the operations of each of the plurality of the image forming sections 25Y, 25M, 25C, 25K and 25D, the exposure section 26, the transfer section 28, and the fixing section 29. The RAM temporarily stores various kinds of data used in the processing by the CPU.

The conveyance control section 301 of the paper conveyance apparatus 10 is connected with the control section 201. The conveyance control section 301 controls the driving of the motor 73. The conveyance control section 301 comprises a CPU, an ROM and an RAM. The ROM stores a control program for controlling the driving of the motor 73. The RAM temporarily stores various kinds of data used in the processing by the CPU.

Hereinafter, the operations of the paper conveyance apparatus 10 interlocking with the reading processing of the scanner section 2 of the image forming apparatus 100 according to the embodiment are described.

First, the information for instructing to execute reading processing on the image information of the original Q is input through the operation section 12 of the control panel 1 by the user. The panel control section 211 receives a processing indicated by the information input through the operation section 12 as a job. The control section 201 acquires the job from the panel control section 211 and writes the acquired job in the RAM thereof. The job contains the image information of the original Q conveyed by the paper conveyance apparatus 10 and the information relating to the processing read by the scanner section 2.

Next, the control section 201 instructs the scanner control section 221 and the conveyance control section 301 to respectively execute the processing corresponding to the job. The control section 201 outputs the information relating to processing executed by each of the scanner control section 221 and the conveyance control section 301. The information output to the scanner section 2 is, for example, the information of the reading resolution, the compressibility, the color information, and the like. The information output to the conveyance control section 301 is, for example, information for instructing to execute paper feeding according to the driving start of the motor 73. Each of the scanner control section 221 and the conveyance control section 301 writes the information from the control section 201 in the RAM thereof.

Next, the conveyance control section 301 starts the conveyance of the original Q placed in the paper feed tray according to the information from the control section 201. When the paper sensor 61 detects the original Q in the paper feed tray 51 in a state in which an instruction to execute paper feeding is received from the control section 201, the conveyance control section 301 starts the conveyance of the original Q. When starting to convey the original Q, the conveyance control section 301 starts the driving of the motor 73. The conveyance control section 301 continues the driving of the motor 73 until an instruction to stop paper feeding is received from the control section 201 or the original Q in the paper feed tray 51 is run out.

Next, if the driving of the motor 73 is started, the conveyance control section 301 lowers the pickup roller 63 towards the original Q in the paper feed tray 51. When the motor 73 rotates, the pickup roller 63 rotates through a rotation driving force transmitted by the first transmission section 75a and the second transmission section 75b from the motor 73. The rotation direction of the pickup roller 63 is a direction in which the original Q in the paper feed tray 51 is to be fed to the paper feed path 53.

When the motor 73 rotates, the paper feed roller 65 rotates through the rotation driving force transmitted by the first transmission section 75a from the motor 73. Similar to the pickup roller 63, the paper feed roller 65 contacts with the first side of the original Q, the rotation direction of the paper feed roller 65 around the rotation axis is the same as that of the pickup roller 63. The rotation direction of the paper feed roller 65 is a direction in which the original Q from the pickup roller 63 is conveyed to the first conveyance roller 67.

When the motor 73 rotates, the first conveyance roller 67 rotates through a rotation driving force transmitted by the third transmission section 75c and the fourth transmission section 75d from the motor 73. As the first conveyance roller 67 is contacted with the second side of the original Q, the rotation direction of the first conveyance roller 67 around the rotation axis thereof is opposite to the rotation direction of the paper feed roller 65 around the axis thereof. The rotation direction of the first conveyance roller 67 is a direction in which the original Q from the paper feed roller 65 is conveyed to the second conveyance roller 69.

When the motor 73 rotates, the second conveyance roller 69 rotates through a rotation driving force transmitted by the third transmission section 75c from the motor 73. Similar to the first conveyance roller 67, since the second conveyance roller 69 is contacted with the second side of the original Q, the rotation direction of the second conveyance roller 69 around the rotation axis thereof is the same as the rotation direction of the first conveyance roller 67. The rotation direction of the second conveyance roller 69 is a direction in which the original Q from the first conveyance roller 67 is conveyed to the reading position T and the paper discharge roller 71.

When the motor 73 rotates, the paper discharge roller 71 rotates through a rotation driving force of the motor 73. The rotation direction of the paper discharge roller 71 is a direction in which the original Q from the second conveyance roller 69 and the reading position T is conveyed to paper discharge tray 52.

The conveyance speed of the original Q by the paper feed roller 65 has a value corresponding to the transmission ratio K1 of the first transmission section 75a and the diameter of the paper feed roller 65. Since the rotation number and the diameter of each of the first conveyance roller 67 and the second conveyance roller 69 are the same, the conveyance speed of each of the first conveyance roller 67 and the second conveyance roller 69 are the same. The conveyance speed of the first conveyance roller 67 has a value corresponding to the transmission ratio K2 of the third transmission section 75c and the diameter of the first conveyance roller 67. The transmission ratio K2 of the third transmission section 75c is greater than the transmission ratio K1 of the first transmission section 75a. The diameter of the first conveyance roller 67 is smaller than the diameter of the paper feed roller 65. The conveyance speed of the original Q by the first conveyance roller 67 is slower than the conveyance speed of the paper feed roller 65.

Since the conveyance speed of the paper feed roller 65 is faster than the conveyance speed of the first conveyance roller 67, the front end in the conveyance direction of the original Q from the paper feed roller 65 abuts against the nip N of the first conveyance roller 67. In response to a difference in the conveyance speed of each of the paper feed roller 65 and the first conveyance roller 67, the original Q from the paper feed roller 65 bends between the paper feed roller 65 and the first conveyance roller 67. The position at the front end of the original Q bent between the paper feed roller 65 and the first conveyance roller 67 is aligned with respect to the conveyance direction in the nip N of the first conveyance roller 67. After the position of the front end is aligned with respect to the conveyance direction in the nip N, the original Q nipped by the first conveyance roller 67 and the first driven roller 68 is conveyed to the second conveyance roller 69. The original Q from the first conveyance roller is conveyed to the reading position T by the second conveyance roller 69.

Next, the scanner control section 221 enables the reading section 13 to read the image information of the original Q at the reading position T according to the information from the control section 201. The scanner control section 221 acquires the image data generated by the reading section 13 based on the image information. The scanner control section 221 outputs the image data to the control section 201. The control section 201 stores the image data from the scanner control section 221 in the storage section 202. The position of the front end in the conveyance direction of the original Q conveyed to the reading position T by the second conveyance roller 69 has already been aligned in the nip N of the first conveyance roller 67. By sequentially reading the image information at the position T of the original Q of which the position of front end is parallel to the horizontal scanning direction x, the reading section 13 generates the entire image data of the original Q.

The original Q passing through the reading position T is conveyed towards the paper discharge roller 71. The original Q from the reading position T is conveyed to the paper discharge tray 52 by the paper discharge roller 71. In this way, the reading of the image information of the original Q (that is conveyed by the paper conveyance apparatus 10) by the scanner section 2 is ended.

In accordance with the embodiment described above, the paper conveyance apparatus 10 is provided with the paper feed roller 65 of which the conveyance speed is relatively faster than that of the first conveyance roller 67, it is possible to align the position of front end of the original Q easily. As the transmission section 75 which transmits the rotation driving force of one motor 73 is arranged, the paper feed roller 65 and the first conveyance roller 67 can be driven to rotate and the front end position of the original Q can be aligned. Because it is not required to separate the driving of each of the paper feed roller 65 and the first conveyance roller 67 and the front end position of the original Q can be aligned, it is possible to prevent the apparatus from increasing in size.

Hereinafter, a modification of the embodiment is described.

It is assumed in the paper conveyance apparatus 10 according to the embodiment described above that the conveyance speed of the original Q by the first conveyance roller 67 is relatively slower than that of the paper feed roller 65. Either the conveyance speed of the first conveyance roller 67 or the conveyance speed of the paper feed roller 65 may be set as a standard.

In the modification of the present embodiment, the conveyance speed of the first conveyance roller 67 may be set as the standard, and the conveyance speed of the paper feed roller 65 may become faster than the standard. The conveyance speed of the paper feed roller 65 may be set as the standard, and the conveyance speed of the first conveyance roller 67 may become slower than the standard. In a case in which the conveyance speed of the first conveyance roller 67 becomes slow, the reading speed of the original Q passing through the reading position T also becomes slow.

It is assumed in the paper conveyance apparatus 10 according to the embodiment described above that the diameter of the first conveyance roller 67 is smaller than the diameter of the paper feed roller 65. However, the present invention is not limited to this.

Figure 5:
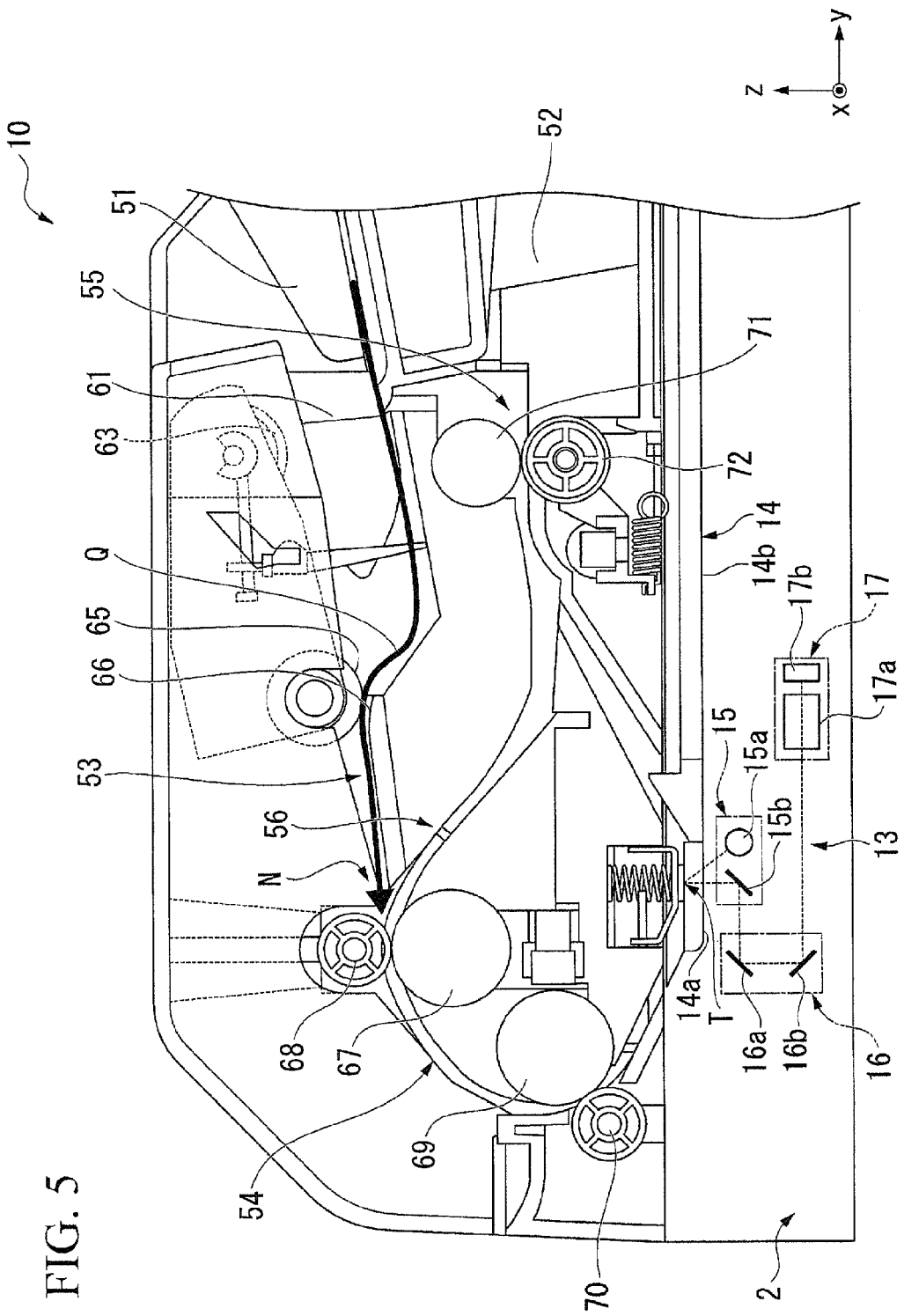
FIG. 5 is a cross-sectional view schematically illustrating an example of the constitution of a paper conveyance apparatus according to the modification of the embodiment.

FIG. 5 is a cross-sectional view schematically illustrating an example of the constitution of a paper conveyance apparatus according to the modification of the embodiment.

As shown in FIG. 5, in the modification of the present embodiment, the diameter of the first conveyance roller 67 may be greater than that of the paper feed roller 65. By making the transmission ratio K2 of the third transmission section 75c higher than the transmission ratio K1 of the first transmission section 75a, the conveyance speed of the first conveyance roller 67 may be slower than the conveyance speed of the paper feed roller 65. By making the rotation number of the paper feed roller 65 larger than the rotation number of the first conveyance roller 67, the conveyance speed of the first conveyance roller 67 may be slower than the conveyance speed of the paper feed roller 65.

It is assumed in the paper conveyance apparatus 10 according to the embodiment described above that the transmission section 75 comprises a plurality of gears. However, no limitation is given to the number of the gears of the transmission section 75.

In the modification of the present embodiment, the transmission section 75 may comprises a stepless speed change device including a plurality of belts, a pulley and the like instead of the plurality of gears.

It is assumed in the paper conveyance apparatus 10 according to the embodiment described above that the conveyance speeds of the plurality of rollers other than the paper feed roller 65 are the same. However, the present invention is not limited to this. The plurality of rollers is the pickup roller 63, the first conveyance roller 67, the second conveyance roller 69 and the paper discharge roller 71.

In the modification of the present embodiment, the conveyance speed of each of the pickup roller 63, the first conveyance roller 67, the second conveyance roller 69 and the paper discharge roller 71 may be different from each other.

In accordance with at least one embodiment described above, as the paper conveyance apparatus 10 is provided with the paper feed roller 65 of which the conveyance speed is relatively faster than that of the first conveyance roller 67, it is possible to align the front end of the original Q easily. As the paper conveyance apparatus 10 is provided with the transmission section 75 which transmits the rotation driving force of one motor 73, the paper feed roller 65 and the first conveyance roller 67 can be driven to rotate and the front end position of the original Q can be aligned. Because it is not required to separate the driving of each of the paper feed roller 65 and the first conveyance roller 67 and the front end position of the original Q can be aligned, it is possible to prevent the apparatus from increasing in size.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A paper conveyance apparatus, comprising:
   a paper feed section on which paper is placed;
   a first roller configured to be arranged at the upstream side of a reading position where the paper is read to convey the paper at a first speed;
   a second roller configured to be arranged between the first roller and the paper feed section to convey the paper at a second speed faster than the first speed;
   a motor;

a fourth roller configured to be arranged between the first roller and the reading position and driven by the motor to convey the paper to the reading position at the first speed; and a transmission section configured to always transmit a rotation driving force of the motor to the first roller and the fourth roller.

2. The paper conveyance apparatus according to claim 1, further comprising:

a first transmission section configured to connect a rotation axis of the fourth roller with a rotation axis of the first roller.

3. The paper conveyance apparatus according to claim 2, further comprising:

one gear configured to mesh with a gear fixed to the rotation axis of the fourth roller and a gear fixed to the rotation axis of the first roller.

4. The paper conveyance apparatus according to claim 2, wherein the rotation driving force of the motor is transmitted to the rotation axis of the fourth roller through the transmission section.

5. The paper conveyance apparatus according to claim 3, wherein a shape of the gear fixed to the rotation axis of the fourth roller is the same as a shape of the gear fixed to the rotation axis of the first roller.

6. The paper conveyance apparatus according to claim 3, wherein, a number of teeth of the gear fixed to the rotation axis of the fourth roller is the same as a number of teeth of the gear fixed to the rotation axis of the first roller.

7. The paper conveyance apparatus according to claim 1, wherein, a diameter of the first roller is equal to a diameter of the fourth roller.

8. An image forming apparatus, comprising:

a reading section configured to read image information of paper at a reading position;

an image forming section configured to form an image on an image receiving medium based on the image information read by the reading section; and a paper conveyance apparatus configured to convey the paper to the reading position, the paper conveyance apparatus comprising:

a paper feed section on which the paper is placed;

a first roller configured to be arranged at the upstream side of the reading position where the paper is read to convey the paper at a first speed;

a second roller configured to be arranged between the first roller and the paper feed section to convey the paper at a second speed faster than the first speed;

a motor;

a fourth roller configured to be arranged between the first roller and the reading position and driven by the motor to convey the paper to the reading position at the first speed; and a transmission section configured to always transmit a rotation driving force of the motor to the first roller and the fourth roller.

9. The image forming apparatus according to claim 8, the paper conveyance apparatus further comprising:

a first transmission section configured to connect a rotation axis of the fourth roller with a rotation axis of the first roller.

10. The image forming apparatus according to claim 9, the paper conveyance apparatus further comprising:

one gear configured to mesh with a gear fixed to the rotation axis of the fourth roller and a gear fixed to the rotation axis of the first roller.

11. The image forming apparatus according to claim 9, wherein the rotation driving force of the motor is transmitted to the rotation axis of the fourth roller through the transmission section.

12. The image forming apparatus according to claim 10, wherein a shape of the gear fixed to the rotation axis of the fourth roller is the same as a shape of the gear fixed to the rotation axis of the first roller.

13. The image forming apparatus according to claim 10, wherein a number of teeth of the gear fixed to the rotation axis of the fourth roller is the same as a number of teeth of the gear fixed to the rotation axis of the first roller.

14. The image forming apparatus according to claim 8, wherein, a diameter of the first roller is equal to a diameter of the fourth roller.

* * * * *